(12) United States Patent
Kaku et al.

(10) Patent No.: US 8,864,208 B2
(45) Date of Patent: Oct. 21, 2014

(54) PANEL LOCKING STRUCTURE FOR CARGO BED OF VEHICLE

(71) Applicant: Kawasaki Jukogyo Kabushiki Kaisha, Hyogo (JP)

(72) Inventors: Hidetoshi Kaku, Kakogawa (JP); Yoshinori Tsumiyama, Miki (JP); Tyler Furman, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/728,058

(22) Filed: Dec. 27, 2012

(65) Prior Publication Data

US 2014/0183882 A1 Jul. 3, 2014

(51) Int. Cl.
 *E05B 65/12* (2006.01)
 *B62D 33/037* (2006.01)
 *E05B 83/16* (2014.01)

(52) U.S. Cl.
 CPC ..................... *E05B 83/16* (2013.01)
 USPC ........................... 296/57.1; 296/50; 292/281

(58) Field of Classification Search
 USPC ............. 296/57.1, 50, 51; 292/23, 29, 30, 95, 292/100, 259.69, 49, 281; 49/394, 395
 See application file for complete search history.

(56) References Cited

U.S. PATENT DOCUMENTS

| | | | | |
|---|---|---|---|---|
| 4,932,694 A | * | 6/1990 | Cater, Sr. ....................... | 292/210 |
| 5,732,575 A | * | 3/1998 | Kaveney ............................ | 70/2 |
| 7,828,356 B2 | * | 11/2010 | Wood et al. ................. | 296/26.11 |
| 2008/0231067 A1 | * | 9/2008 | Nagle .............................. | 296/50 |
| 2013/0223888 A1 | * | 8/2013 | Tanner et al. .................. | 399/239 |

FOREIGN PATENT DOCUMENTS

| | | |
|---|---|---|
| JP | 2-93190 | 7/1990 |
| JP | 3-52291 | 5/1991 |

* cited by examiner

*Primary Examiner* — Dennis H Pedder
*Assistant Examiner* — Beverly Becker
(74) *Attorney, Agent, or Firm* — Wenderoth, Lind & Ponack, L.L.P.

(57) ABSTRACT

A utility vehicle according to the invention includes a cargo bed having a panel locking mechanism. The panel locking mechanism includes a locking lever pivotably supported on a gate-type panel, a substantially U-shaped movable hook made of a spring steel and coupled to a middle of the locking lever, and a stationary hook provided on a panel adjacent to the gate-type panel and with which the movable hook is engageable. When seen from above, the middle portion of the movable hook is pressed onto a surface of the gate-type panel so as to press the gate-type panel inward of the cargo bed by a resilient force upon locking. For example, the movable hook can be formed with a straight portion.

7 Claims, 10 Drawing Sheets

PANEL LOCKING STRUCTURE FOR CARGO BED OF VEHICLE

BACKGROUND OF THE INVENTION

1. Field of the Invention

The present invention relates to a panel locking structure for a cargo bed of a vehicle including a cargo bed having an openable and closable gate-type panel and a panel locking mechanism holding the gate-type panel in a closed position in which the gate-type panel is erected.

2. Description of the Prior Art

A cargo bed of a vehicle typically includes a bottom plate, right and left side panels, a tail panel, and a front panel. The tail panel and/or the side panels are of the openable and closable gate-type for loading and unloading the vehicle.

The gate-type panel is turnably supported at the end of the bottom plate via a hinge so as to be changeable between a closed position in which the gate-type panel is erected substantially perpendicularly from the bottom plate and an opened position in which the gate-type panel is hung from the bottom plate. To hold the gate-type panel in the closed position, a panel locking mechanism is provided.

Figure 9:
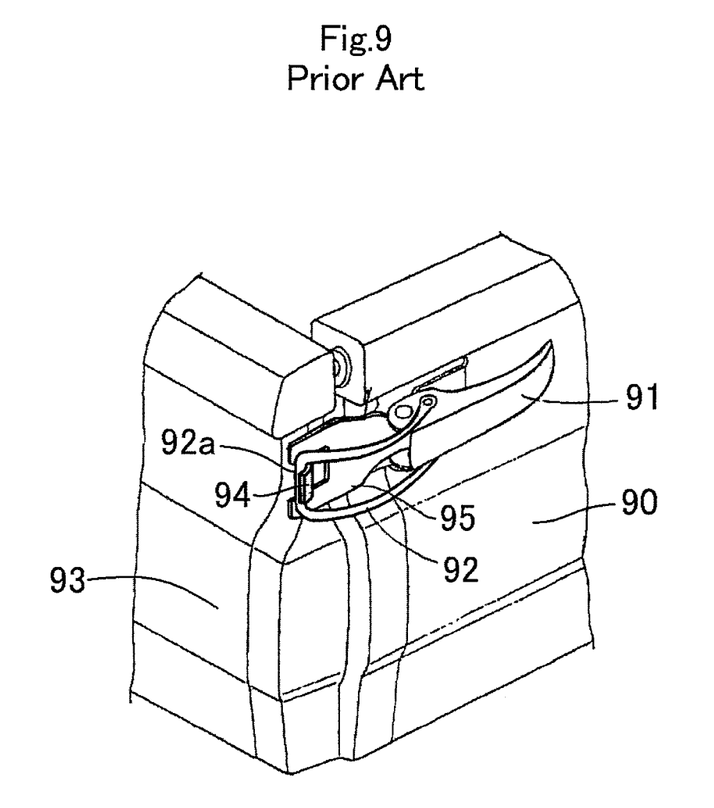
FIG. 9 is a perspective view of a conventional example.

JP 3-52291 Y and JP 2-93190 Y disclose conventional panel locking mechanisms for a cargo bed. FIG. 9 shows a conventional example of JP 3-52291 Y. A locking handle 91 is turnably provided on a gate-type panel 90. A U-shaped handle ring 92 is coupled to the locking handle 91. A stationary hook 94 is provided on a stationary panel 93. To prevent rattling of the gate-type panel 90, a plate-shaped retaining member 95 is provided on the gate-type panel 90. The end of the retaining member 95 is pressed by an end 92a of the handle ring 92. The portion of the handle ring 92 other than the end 92a is away from the panels 90 and 93 and the retaining member 95.

Figure 10:
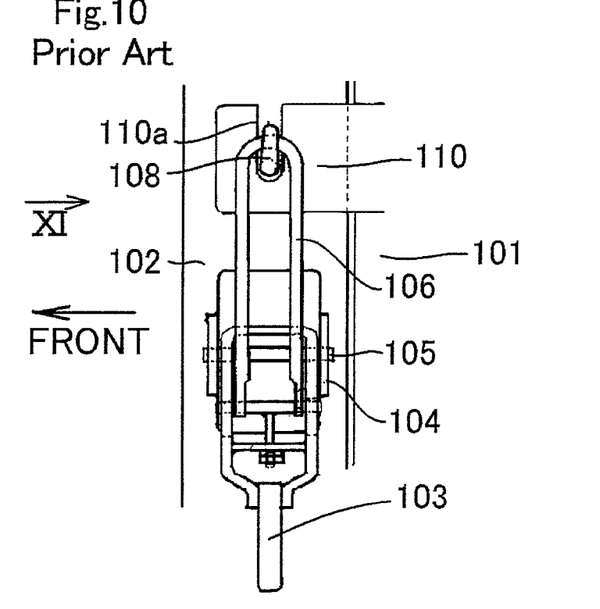
FIG. 10 is a side view of another conventional example.

FIGS. 10 and 11 show a conventional example of JP 2-93190 Y. In FIG. 10, a latch plate 110 is provided at the front end of a gate-type side panel 101, the latch plate 110 having a groove 110a. The latch plate 110 is pressed onto and locked to the side end of a front panel 102 by a movable hook 106. A latch handle 103 is supported by a bracket 104 of the front panel 102 via a support shaft 105. An adjust mechanism 112 is provided in the supporting portion of the movable hook 106, the adjust mechanism 112 including a spring and an adjust bolt. An L-shaped stationary hook 108 is provided above the bracket 104.

Figure 11:
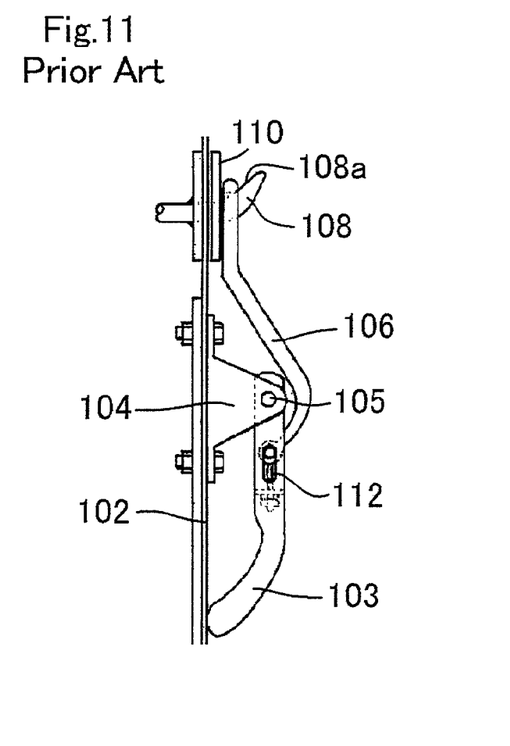
FIG. 11 is a diagram viewed in the direction of arrow XI of FIG. 10.

In FIG. 11, an edge 108a of the stationary hook 108 is inclined relative to the horizontal plane. Thereby, the end of the movable hook 106 presses the latch plate 110 to prevent rattling of the side panel 101 during driving.

To prevent rattling of the panel, in the conventional example of JP 3-52291 Y, the retaining member 95 (FIG. 9) for preventing rattling is necessary, and in the conventional example of JP 2-93190 Y, the latch plate 110 and the adjust mechanism 112 (FIGS. 10 and 11) are necessary. That is, in both the conventional examples, special members for preventing rattling are necessary.

SUMMARY OF THE INVENTION

An object of the present invention is to provide a panel locking structure for a cargo bed of a vehicle capable of locking an openable and closable gate-type panel of the cargo bed so as to prevent rattling of the gate-type panel during the driving of the vehicle without additionally providing any members for preventing rattling.

To achieve the above object, a panel locking structure for a cargo bed of a vehicle according to the present invention includes a cargo bed having an openable and closable gate-type panel, and a panel locking mechanism holding the gate-type panel in a closed position in which the gate-type panel is erected. The panel locking mechanism includes a locking lever turnably supported on the gate-type panel, a substantially U-shaped movable hook made of a spring steel and turnably supported in the middle of the locking lever, and a stationary hook provided on a panel adjacent to the gate-type panel and with which the movable hook is engageable. When seen from above (in plan view), the middle portion of the movable hook is pressed onto a surface of the gate-type panel so as to press the gate-type panel inward of the cargo bed by a resilient force upon locking.

With the above configuration, by using the resilient force of the substantially U-shaped movable hook made of spring steel, rattling of the gate-type panel during driving can be prevented. In addition, the number of components for the locking mechanism does not increase.

The panel locking structure for a cargo bed of a vehicle can preferably adopt the following configurations.

(a) The gate-type panel is a tail panel arranged at a rear end of the cargo bed, and the adjacent panel includes side panels arranged on right and left sides of the tail panel.

With the above configuration, in the cargo bed having a dumping function, the tail panel which is likely to rattle during driving can be fixed so as not to rattle.

(b) When seen from a turning axis direction of the movable hook, a portion of the movable hook on the stationary hook side is formed substantially linearly, and a portion of the movable hook on the turning axis side is formed curvedly and projects in a direction away from the gate-type panel.

With the above configuration, the straight portion of the movable hook is abutted onto the gate-type panel in a wide range upon locking. The retaining operation can thus be always always be ensured.

(c) The stationary hook is provided on a metal core formed at the rear end of each of the side panels.

With the above configuration, the attaching strength of the stationary hook is improved.

(d) The gate-type panel is formed with a recess for accommodating an accessory recessed outward of the cargo bed.

With the above configuration, the space of the cargo bed can be effectively used, and the rigidity of the gate-type panel is improved.

(e) An inner surface of each of the side panels is provided with a plurality of grooves for engaging a partitioning plate from an upper end of the panel to a lower end of the panel.

With the above configuration, by inserting the partitioning plate into the grooves, the cargo bed can be sectioned into a desired number of spaces. Thus, the moving of a load during driving can be prevented. In addition, the grooves serve as ribs, so that the strength of the panel is improved.

(f) The gate-type cargo bed panel is formed with a recess for accommodating an accessory recessed outward of the cargo bed.

With the above configuration, the space of the cargo bed can be effectively used, and the rigidity of the gate-type panel is improved.

(g) In the structure including the gate-type tail panel, the panel locking mechanism is attached to an inclined surface inclined forward relative to a perpendicular plane along a rear end face of the tail panel.

With the above configuration, the panel locking mechanism is directed rearward and upward. Therefore, an operator can easily see and operate the panel locking mechanism from the rear of the vehicle. In addition, the panel locking mechanism can be made so as not to project rearward of the rear edge of the tail panel. Therefore, the panel locking mechanism can be protected when the vehicle moves rearward.

DETAILED DESCRIPTION OF THE INVENTION

Figure 1:
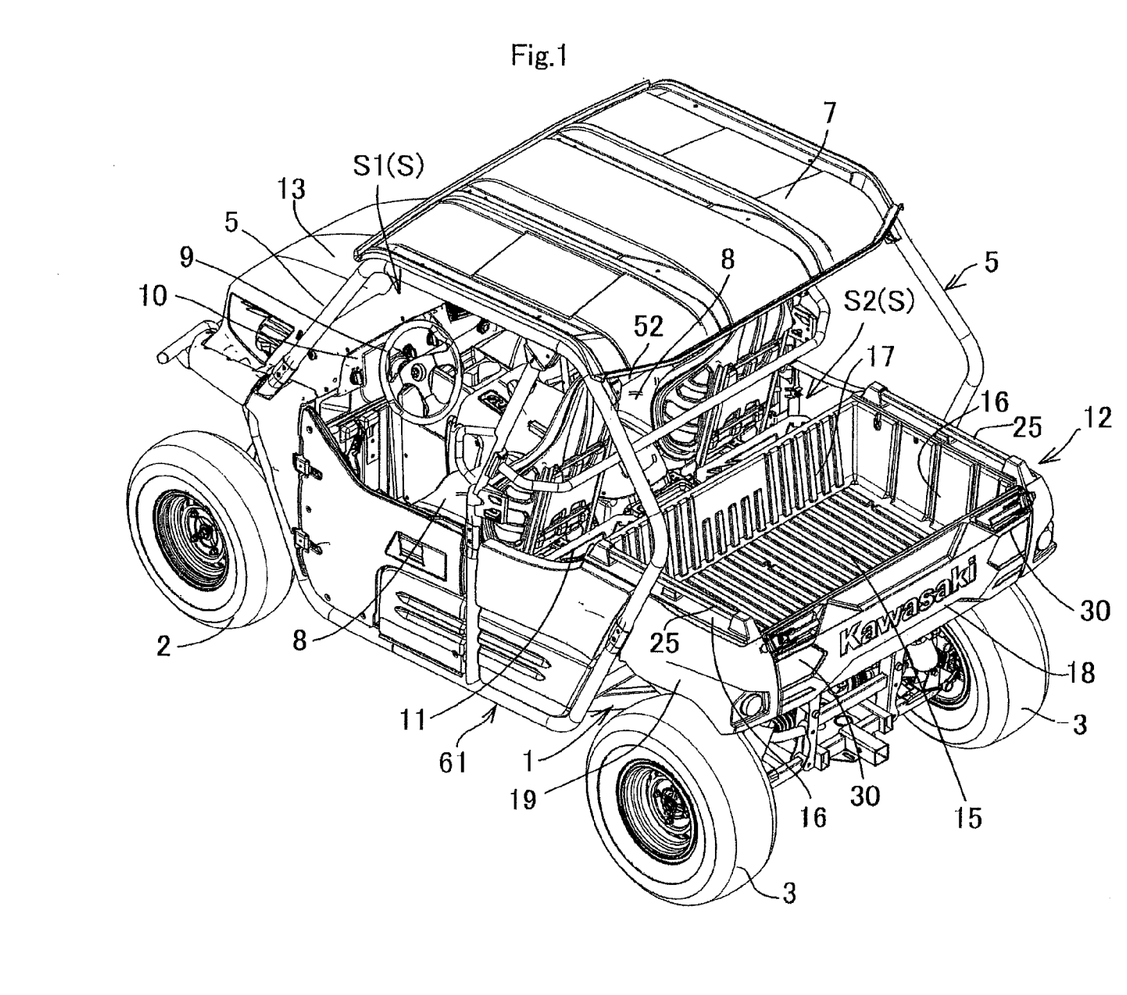
FIG. 1 is a perspective view of an example of a utility vehicle according to the present invention.

An example of the present invention will be described with reference to FIGS. 1 to 7. FIG. 1 is a perspective view of an example of a utility vehicle according to the present invention. In the utility vehicle, a chassis 1 is provided with a pair of right and left front wheels 2 at the front thereof, and a pair of right and left rear wheels 3 at the rear thereof. A space S over the chassis 1 between the front wheels 2 and the rear wheels 3 is surrounded by a ROPS 5 having a roof 7. The space S includes a front riding space (cabin) S1 and a rear storage space S2. In the riding space S1, a front seat row including a pair of right and left front seats 8, a steering wheel 9, and a dashboard 10 are arranged. In the storage space S2, a pair of right and left storage boxes 11 are arranged. A dumping type cargo bed 12 is provided behind the storage space S2. A hood 13 is provided in front of the riding space S1.

Figure 2:
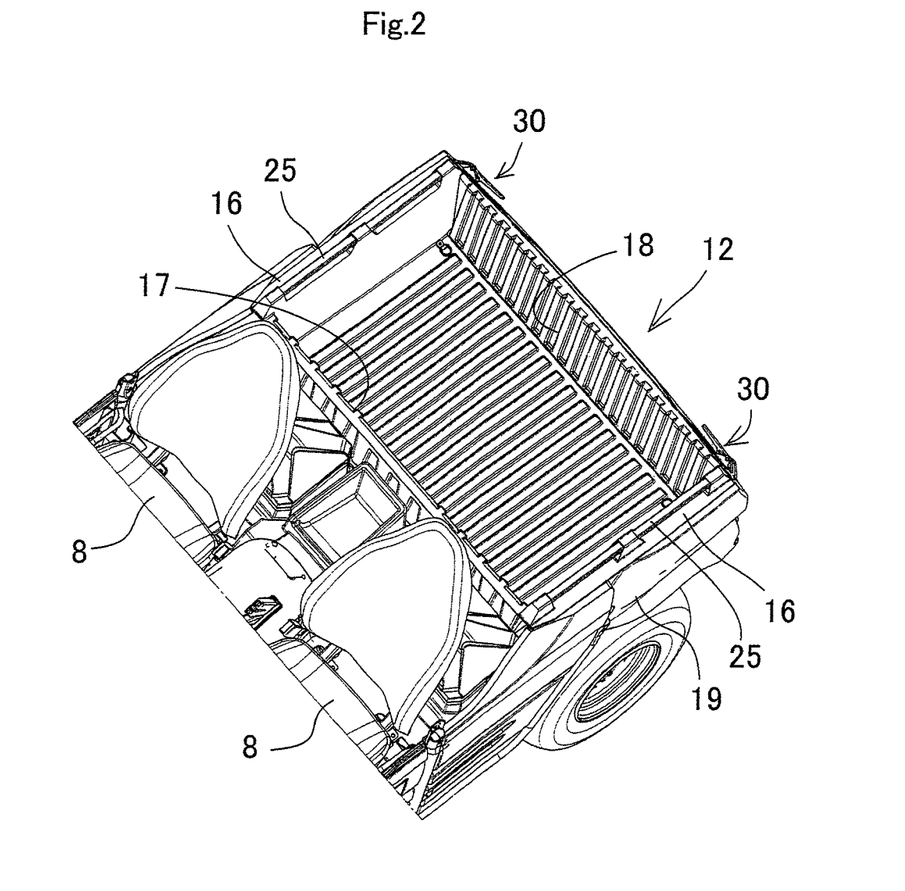
FIG. 2 is a perspective view of a cargo bed of the utility vehicle of FIG. 1.

FIG. 2 is a perspective view of the rear of the vehicle. The cargo bed 12 includes a bottom plate 15, a pair of right and left side panels 16, a front panel 17, and a tail panel (rear panel) 18. The front panel 17, the right and left side panels 16, and the bottom plate 15 are integrally formed by injection molding using a resin material. The tail panel 18 is an openable and closable gate-type panel, and is formed of a member different from that of the front panel 17, the side panels 16, and the bottom plate 15. A position of the tail panel 18 is turnably changeable between a closed position in which the tail panel 18 is erected substantially vertically and an opened position in which the tail panel 18 is hung from the bottom plate 15. The tail panel 18 is formed of e.g., a sheet metal material or a reinforced resin material. In addition, external covers 19 for design are arranged on the outer sides of the right and left side panels 16.

The bottom plate 15 is formed with a large number of ribs extending in the front-rear direction. The front surface of the tail panel 18 is provided with a large number of ribs extending in the up-down direction.

Figure 4:
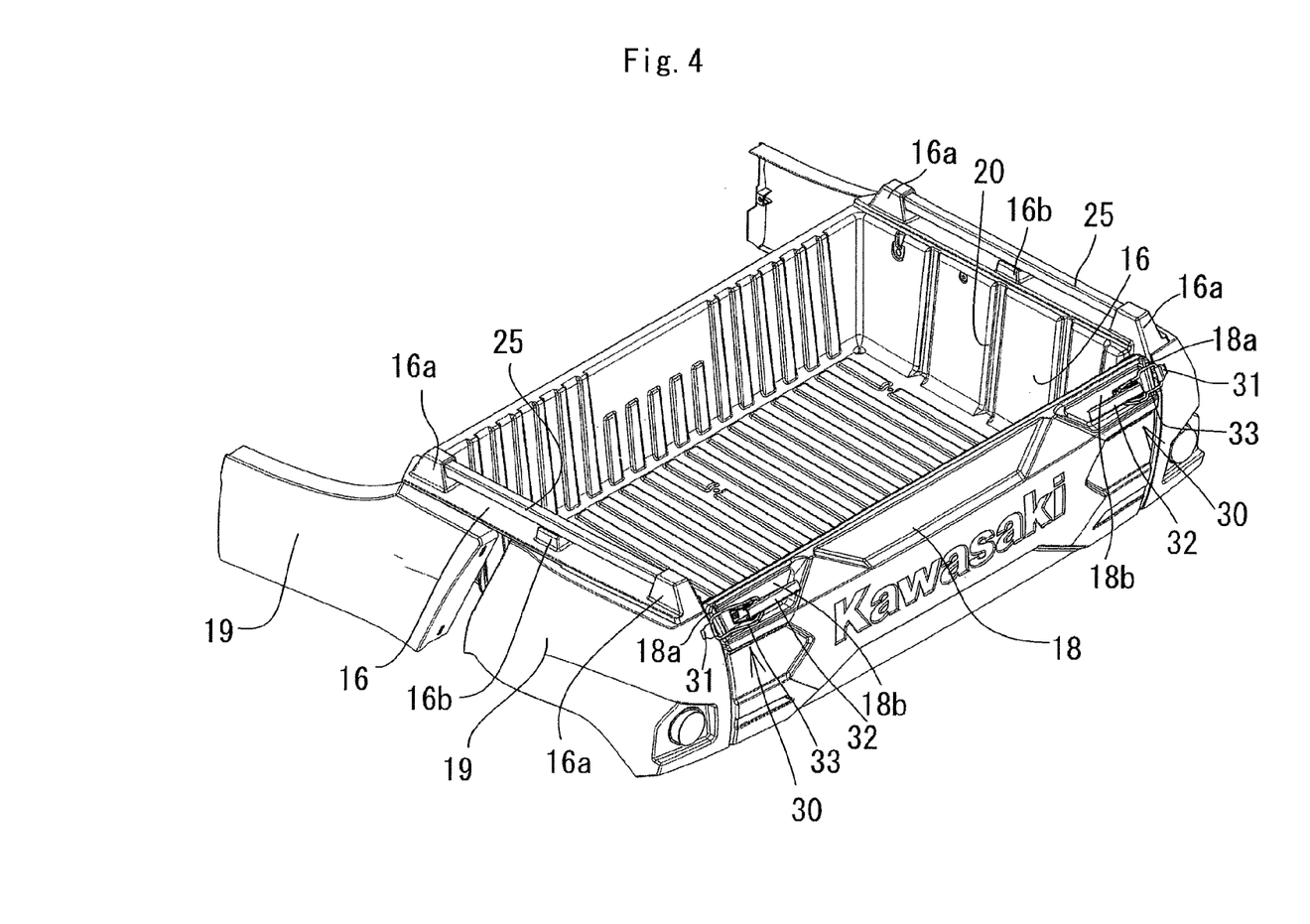
FIG. 4 is an enlarged perspective view of the cargo bed in a locked state.

FIG. 4 is an enlarged perspective view of the vehicle, seen from the rear. The rear surface of the front panel 17 is provided with a large number of ribs extending in the up-down direction. The inner surface of each of the right and left side panels 16 is provided with a plurality of grooves 20 for engaging a partitioning plate with spacing in the front-rear direction, the grooves 20 extending in the up-down direction. The partitioning plate can be inserted into the grooves 20. That is, the partitioning plate between the right and left side panels 16 is inserted into the grooves 20 in a desired position. Therefore, the inside of the cargo bed 12 can be partitioned into a desired number of spaces.

Panel locking mechanisms 30 for locking the tail panel 18 into the closed position are provided at the right and left ends of the rear surface of the tail panel 18.

Figure 3:
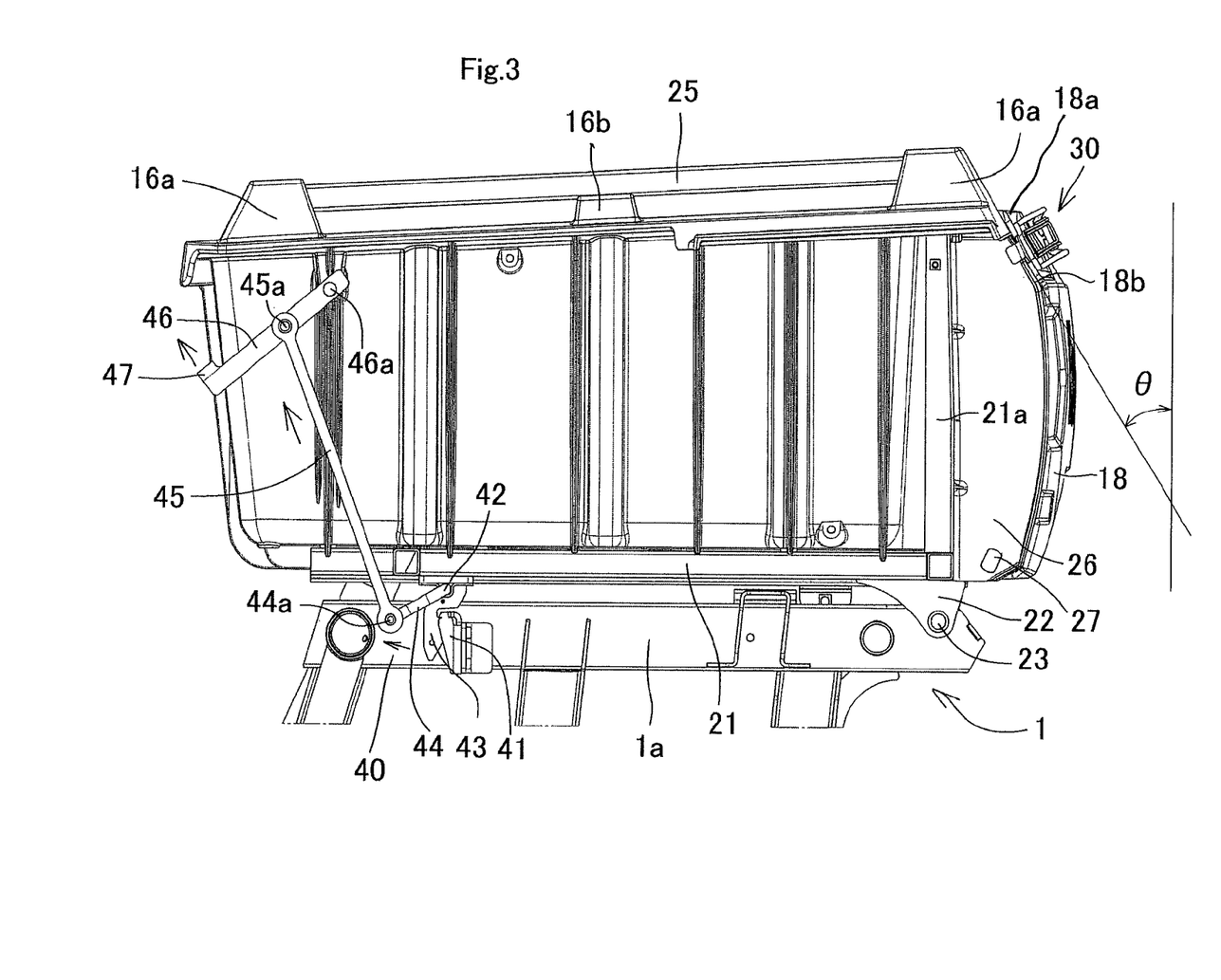
FIG. 3 is a left side view of the cargo bed of FIG. 2 in which an external cover is detached.

FIG. 3 is a left side view of the cargo bed 12 in which the external cover 19 (FIG. 2) is detached. A bottom frame 21 made of a metal pipe is fixed to the lower end of the cargo bed 12. A bracket 22 provided at the rear end of the bottom frame 21 is turnably supported at the rear end of a rear frame 1a of the chassis 1 via a horizontal dumping support shaft 23. Thereby, the front end of the cargo bed 12 can be raised and lowered about the dumping support shaft 23. That is, the dumping operation is enabled.

A pair of right and left cargo bed locking mechanisms 40 are provided at the front end of the bottom frame 21 to lock the cargo bed 12 into a normal position (non-dumping position). Each of the cargo bed locking mechanisms 40 has a stationary hook 41 provided at the front end of the rear frame 1a of the chassis 1, a turning shaft 42 turnably supported on the lower surface at the front end of the bottom frame 21, a movable hook 43 fixed to the turning shaft 42 so as to be integrally turnable, a turning arm 44 integrally formed to the turning shaft 42 and extending forward, a link 45 coupled to the turning arm 44 via a pin 44a and extending upward along the side surface of the side panel 16, and an operating lever 46 coupled to the upper end of the link 45 via a pin 45a.

The operating lever 46 is arranged along the outer side surface of the side panel 16. The rear end of the operating lever 46 is turnably supported on the side panel 16 via a support shaft 46a. The operating lever 46 extends forward and downward along the outer side surface of the side panel 16. The front end of the operating lever 46 is provided with a grip 47, which is located in front of the front panel 17 and folded inward in the vehicle width direction.

In FIG. 2 showing an essential part of FIG. 1, the grip 47 of the operating lever 46 is located in front of the front panel 17 and is exposed to the outside, but the operating lever 46 and the link 45 are covered with the external cover 19 and are hidden from the outside.

FIG. 3 shows the cargo bed in a locked state. When the grip 47 of the operating lever 46 is raised from the state of FIG. 3, the link 45 is raised to turn the turning arm 44 and the movable hook 43 forward, so that the recess of the movable hook 43 is disengaged from the stationary hook 41. That is, the locking of the cargo bed 12 is released to lift the front end of the cargo bed 12 about the support shaft.

Pipe supporting legs 16a which project upward are integrally formed on the side panel 16 at the front and rear ends on the upper surface of the side panel 16. A metal square pipe 25 extending substantially along the entire length of the side panel 16 is supported between the pipe supporting legs 16a. In addition, an intermediate supporting leg 16b, which supports the middle portion in the front-rear direction of the square pipe 25 from below, is integrally formed on the side panel 16 in the middle portion in the front-rear direction on the upper surface of the side panel 16. The square pipe 25 can be used for many applications of e.g., roping and fixing a load and of attaching an accessory.

The bottom frame 21 of the cargo bed 12 is integrally provided, at the rear end thereof, with a pair of right and left struts 21a made of metal pipes and extending upward. Reinforcing metal tail plates or cores 26 are fixed to the rear surfaces of the struts 21a.

Figure 5:
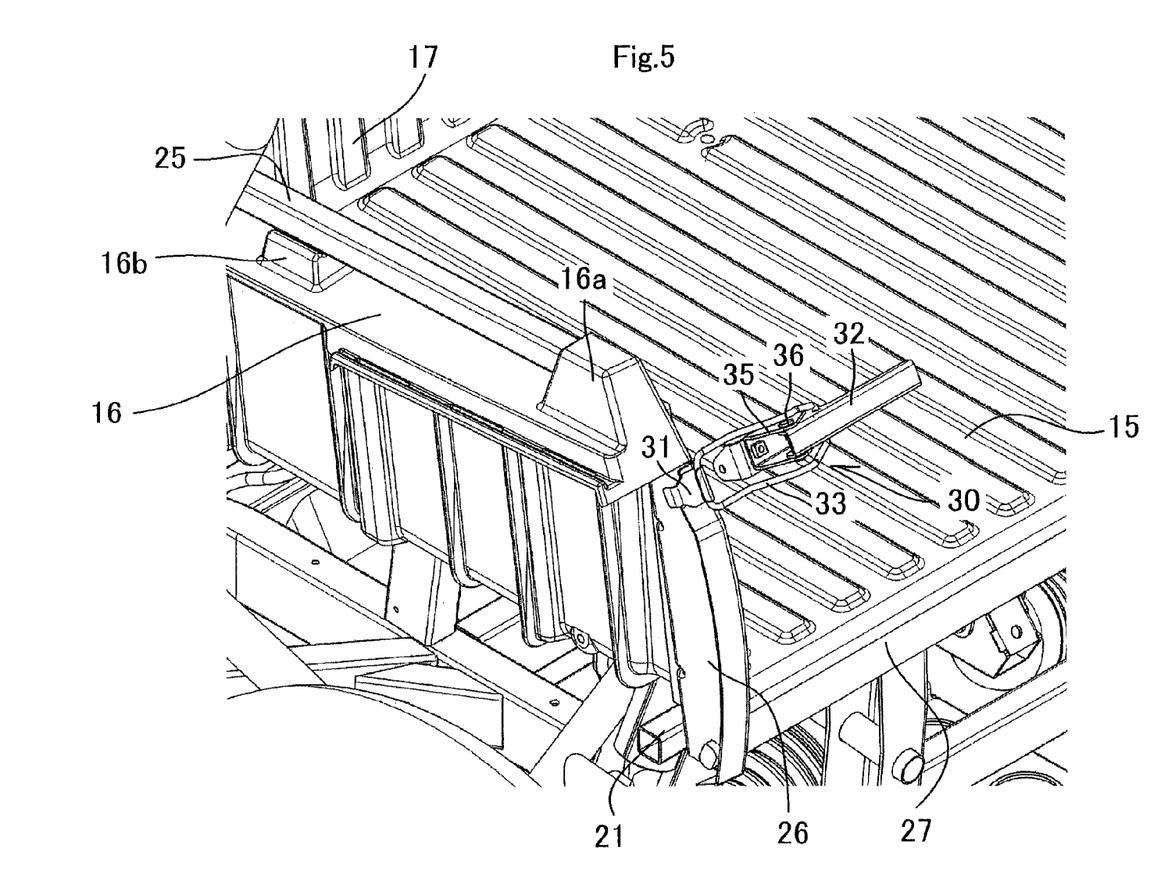
FIG. 5 is a perspective view of a panel locking mechanism in a locked state in which a tail panel is detached.

FIG. 5 is an enlarged perspective view of the left corner of the cargo bed 12. A support shaft 27 turnably supporting the tail panel 18 is supported at the lower ends of the right and left metal tail plates or cores 26. A stationary hook 31 for each of the panel locking mechanisms 30 is fixed to the upper end on the rear surface of each of the metal tail plates or cores 26 by welding.

Figure 6:
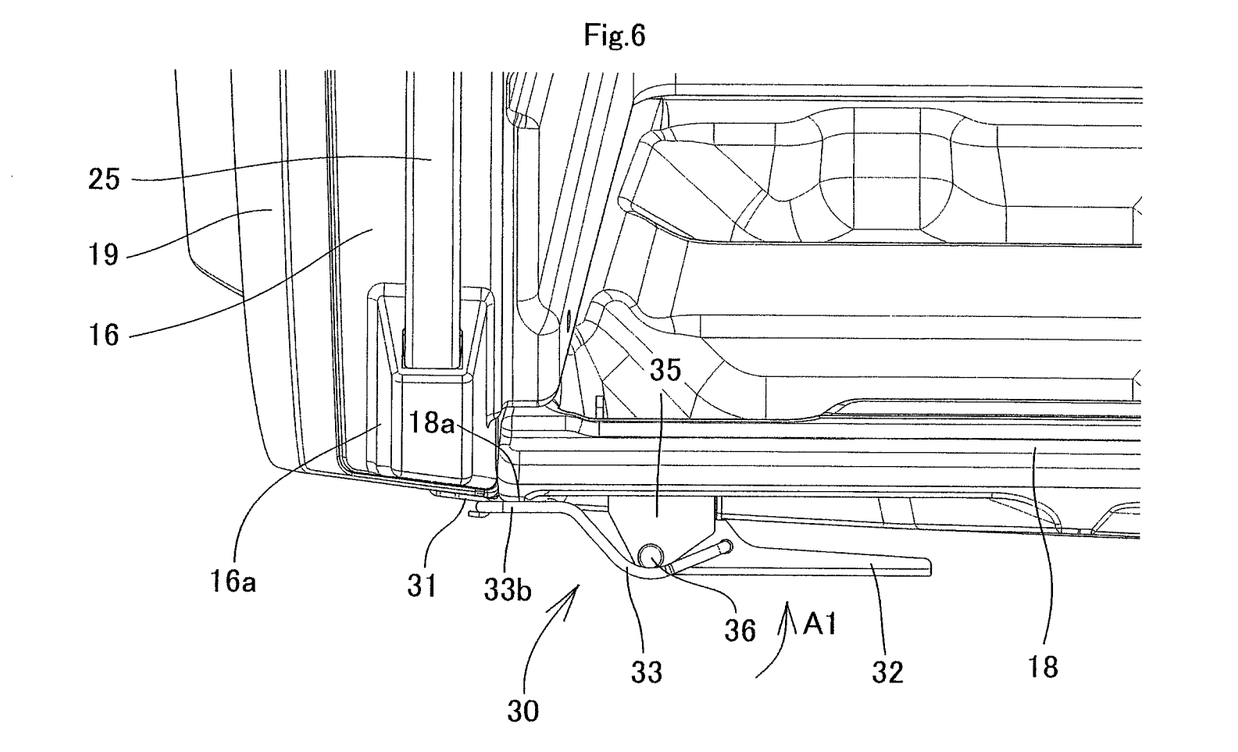
FIG. 6 is an enlarged plan view of the panel locking mechanism in a closed position.
Figure 7:
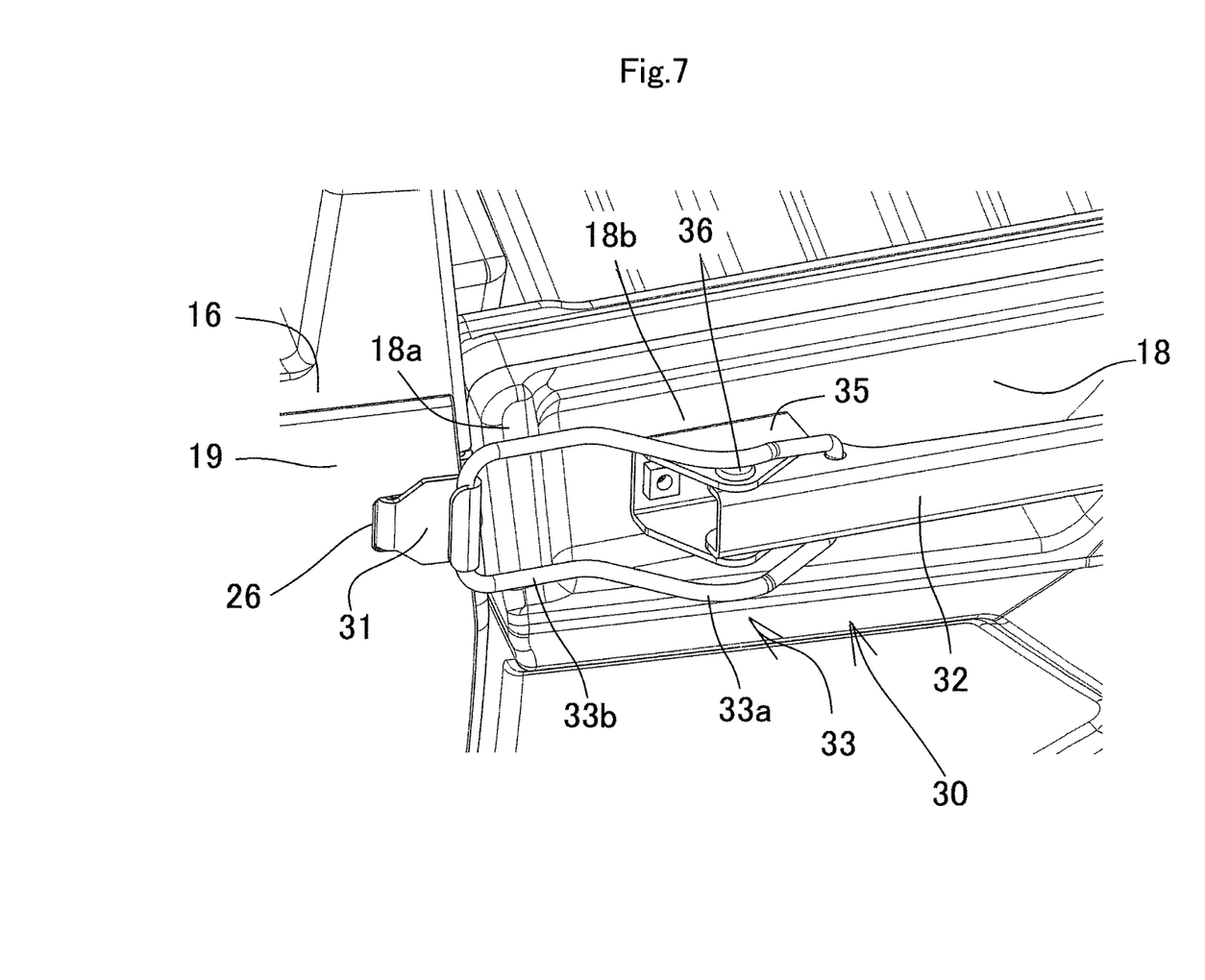
FIG. 7 is an enlarged perspective view of the panel locking mechanism in a locked state.

Referring to FIGS. 6 and 7, the panel locking mechanism 30 will be described in detail. FIG. 7 is an enlarged perspective view of the panel locking mechanism 30. The panel locking mechanism 30 has the stationary hook 31 fixed to the reinforcing metal tail plate or core 26 as described above, a locking lever 32 provided at the upper end on the rear surface of the tail panel 18, and a U-shaped movable hook 33 made of a spring steel and turnably (pivotably) coupled to the middle portion (midsection) in the length direction of the locking lever 32.

The locking lever 32 is turnably supported by a bracket 35 (fixed to the tail panel 18) via a substantially vertical support shaft 36. The locking lever 32 extends from the support shaft 36 in the opposite direction of the stationary hook 31. The movable hook 33 extends from the locking lever 32 to the stationary hook 31. The movable hook 33 has a curved portion 33a curved rearward (as seen from above in plan view), and a straight portion 33b linearly extending from the curved portion 33a to the stationary hook 31 (as seen from above. The movable hook 33 can be resiliently extended and contracted in the right-left direction by the flexing of the curved portion 33a.

Bumps 18a projecting rearward are integrally formed on the tail panel 18 on the rear surfaces at the right and left ends of the tail panel 18. At the time of locking the panel, the straight portion 33b of the movable hook 33 is abutted onto the flat rear surface of each of the bumps 18a at a fixed pressure (directly abutted, as shown in FIG. 6).

In addition, in FIGS. 6 and 7, the bracket 35 supporting the locking lever 32 is attached onto the attaching surface 18b formed at the upper end on the rear surface of the tail panel 18 as described above. However, the attaching surface 18b is inclined forward at angle θ relative to the perpendicular plane along the rear end of the tail panel 18.

In FIG. 6, when the tail panel 18 is locked into the closed position by the panel locking mechanism 30, the end of the movable hook 33 is engaged with the stationary hook 31 to allow the locking lever 32 to pivot in the locking direction indicated by arrow A1 about the support shaft 36. Line M1 connecting the right and left ends of the movable hook 33 crosses the axis of the support shaft 36 forward, so that the pulling force of the movable hook 33 made of a spring steel is changed to the force turning the locking lever 32 forward. Thereby, the locking lever 32 is biased forward, the movable hook 33 is pulled in the right-left direction and is biased forward, and the straight portion 33b of the movable hook 33 is pressed onto the rear surface of the bump 18a of the tail panel 18 by a fixed pressing force. Thereby, the tail panel 18 is firmly locked, so that the tail panel 18 does not rattle even by vibration during driving.

When the locking of the tail panel 18 is released, the locking lever 32 is pivoted from the state of FIG. 6 in the opposite direction of the direction indicated by arrow A1 to disengage the locking lever 32 from the stationary hook 31.

Effects of the Embodiment (1) The movable hook 33 of the panel locking mechanism 30 resiliently presses the bump 18a of the tail panel 18 from the rear, seen from above. Therefore, rattling of the tail panel 18 during driving can be prevented. In addition, the number of components for the panel locking mechanism 30 does not increase.

(2) The movable hook 33 has the straight portion 33b, so that the straight portion 33b is abutted onto the bump 18a upon locking of the panel. Therefore, the bump 18a can be pressed in a wide range, so that the stable retaining operation is ensured.

(3) The stationary hook 31 of the panel locking mechanism 30 is provided on the metal tail plate or core 26 formed at the rear end of the side panel 16. Thus, the attaching strength of the stationary hook 31 and the strength of the entire panel locking mechanism 30 are improved.

(4) The inner surface of the side panel 16 is provided with the grooves 20 for engaging the partitioning plate, so that the partitioning plate can be fixed into the cargo bed 12. Therefore, the space of the cargo bed 12 is sectioned into any number of spaces, so that the moving of a load during driving can be prevented. In addition, the rigidity of the side panel 16 is improved.

(5) The attaching surface 18b for attaching the bracket 35 supporting the locking lever 32 is inclined forward at angle θ relative to the perpendicular plane along the rear end of the tail panel 18. With this configuration, the panel locking mechanism 30 is directed rearward and upward. Therefore, the operator can easily see and operate the panel locking mechanism 30 from the rear of the vehicle. In addition, the panel locking mechanism 30 can be made so as not to project rearward of the rear edge of the tail panel 18. Therefore, the panel locking mechanism 30 can be protected when the vehicle moves rearward.

Figure 8:
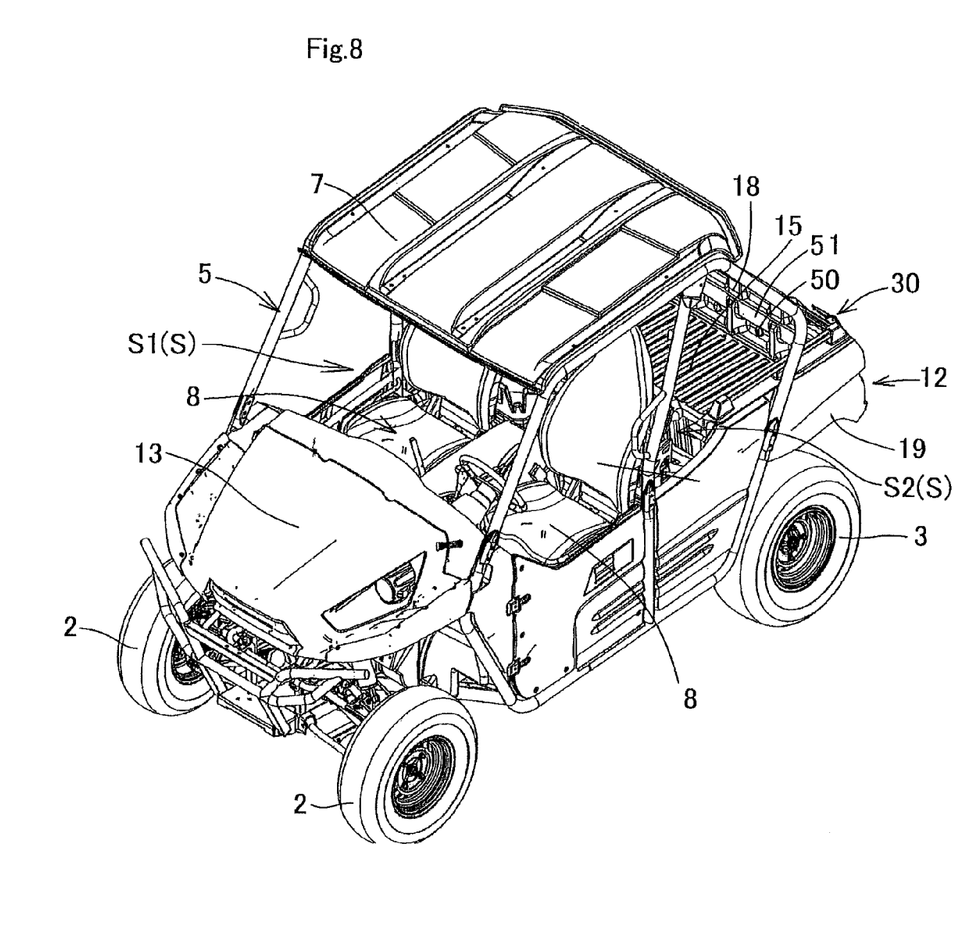
FIG. 8 is a perspective view of the utility vehicle of another example.

Other Embodiments (1) FIG. 8 shows another embodiment. A recess 50 for accommodating a small article is integrally formed on the inner surface of the tail panel 18 of the cargo bed 12. A lid 51 is openably and closably attached to the recess 50. Other configuration is the same as that of FIGS. 1 to 7, and the same components and members as FIGS. 1 to 7 are indicated by similar reference numerals.

The recess 50 can accommodate therein an accessory such as a toolbox or a jack, and leisure goods such as a lunchbox or portable cooked food.

(2) In the above embodiment, the panel locking mechanism for locking the gate-type tail panel has been described. However, the present invention is also applicable to a panel locking mechanism for locking gate-type side panels.

(3) The present invention is not limited to the panel locking structure for a cargo bed of a utility vehicle, and can also include a panel locking structure for a cargo bed of a typical truck.

(4) The present invention is not limited to the structure of the embodiment, and includes various modification examples contemplated in the scope without departing from the contents described in the claims.

What is claimed is:

1. A panel locking structure for a cargo bed of a vehicle, comprising:

a cargo bed having an openable and closable gate-type tail panel at a rear end of said cargo bed and a side panel adjacent to said gate-type tail panel in a width direction of the vehicle, said gate-type tail panel and said side panel being separate, discrete panels; and a panel locking mechanism for holding said gate-type tail panel in a closed position, said panel locking mechanism including:

a locking lever pivotably supported on a rear surface of said gate-type tail panel via a bracket and a vertical support shaft, said rear surface of said gate-type tail panel having a bump located between said locking lever and a rear end surface of said side panel;

a substantially U-shaped movable hook made of spring steel, said movable hook having a first end pivotably supported at a midsection of said locking lever, a second end opposite said first end, and a straight section; and a stationary hook fixed to said rear end surface of said side panel and configured to engage said second end of said movable hook;

wherein, in a locked state in which said gate-type tail panel is in a closed position, a rear surface of said bump is within a plane of said rear end surface of said side panel, said second end of said movable hook is engaged with said stationary hook of said side panel and a pulling force is applied to said movable hook by pivoting said locking lever in a locking direction, a midsection of said straight portion of said movable hook with respect to a longitudinal direction of said movable hook directly presses onto said rear surface of said bump of said gate-type tail panel so as to press said gate-type tail panel in a forward direction of said cargo bed by a resilient force.

2. The panel locking structure according to claim 1, wherein said side panel is one of a pair of side panels located on opposite side of said gate-type tail panel, each of said side panels has a metal core at a rear end thereof, said stationary hook being mounted on said metal core of a respective one of said side panels.

3. The panel locking structure according to claim 1, wherein said panel locking mechanism is mounted on an inclined surface of said gate-type tail panel, said inclined surface being inclined forward relative to a perpendicular plane along a rear end face of said gate-type tail panel.

4. The panel locking structure according to claim 1, wherein, when viewed from a pivoting axis-direction of said movable hook, said straight portion of said movable hook is formed substantially linearly, and a portion of said movable hook closer to said first end of said movable hook is curved and projects in a direction away from said gate-type tail panel.

5. The panel locking structure according to claim 1, wherein said gate-type tail panel has a recess for accommodating an accessory, said recess being recessed outward of said cargo bed.

6. The panel locking structure according to claim 1, wherein said side panel is a first one of a pair of opposing side panels, an inner surface of each of said side panels having a plurality of grooves for engaging a partitioning plate inserted from an upper end of each of said panels to a lower end of each of said panels.

7. The panel locking structure according to claim 1, wherein, when viewed from above, said midsection of said straight portion of said movable hook with respect to a longitudinal direction of said movable hook directly presses onto said rear surface of said bump of said gate-type tail panel so as to press said gate-type tail panel inward of said cargo bed by a resilient force.

* * * * *